May 4, 1954
R. L. PILLING
2,677,516
MEANS AND METHOD FOR REDUCING TIRE FRICTION
ON AIRPLANE LANDING WHEELS
Filed Sept. 14, 1950
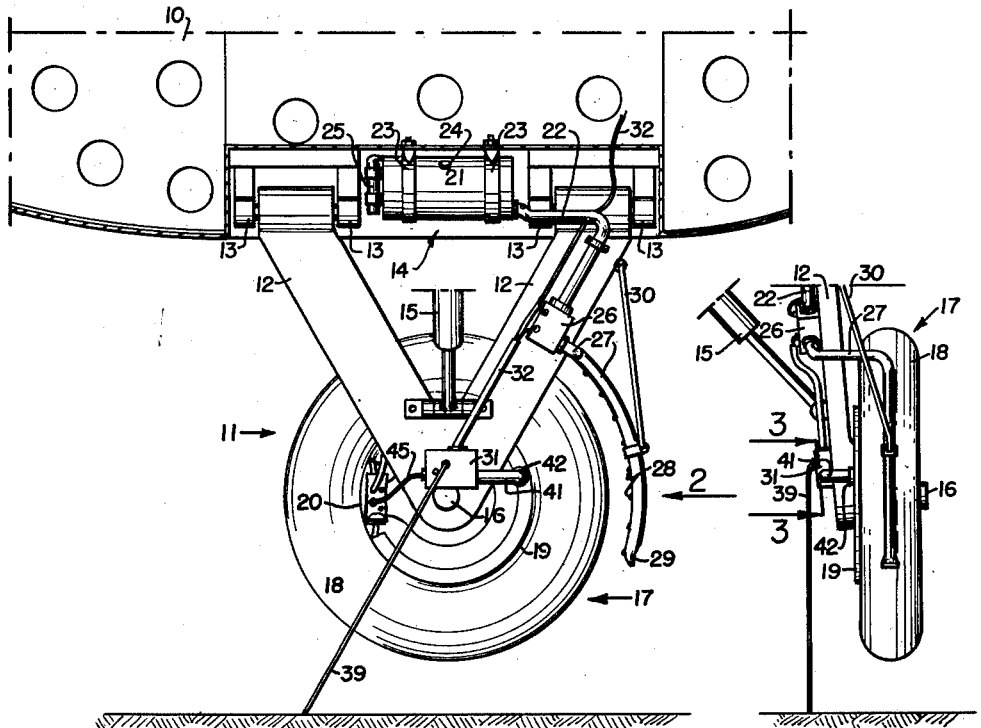
Fig. 1
Fig. 2
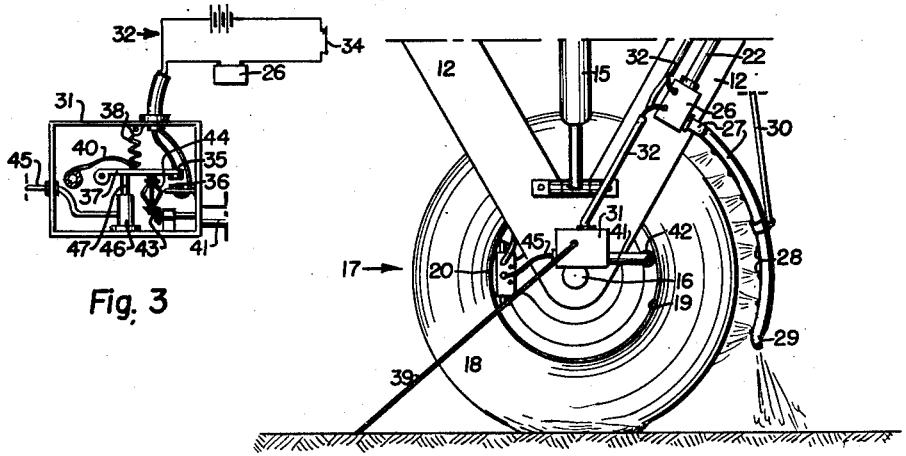
Fig. 3
Fig. 4
Inventor
REX L. PILLING
By WHITEHEAD & VOGL
PER *Carli Whitehead*
Attorneys

Patented May 4, 1954

2,677,516

UNITED STATES PATENT OFFICE 2,677,516

MEANS AND METHOD FOR REDUCING TIRE FRICTION ON AIRPLANE LANDING WHEELS

Rex L. Pilling, Denver, Colo.

Application September 14, 1950, Serial No. 184,828

6 Claims. (Cl. 244—103)

This invention relates to means and method for reducing friction and wear upon the tires of landing wheels of airplanes as they contact the runway of a landing field at high speed during a landing operation, and has as an object to provide a lubricating medium to the tires and the runway to allow slippage of the tires until the wheels attain sufficient speed to roll upon the runway.

Another object of this invention is to provide means for spraying the landing-wheel-tires of an airplane with water as the airplane approaches a landing to thereby reduce the frictional drag and intense landing shock which occurs when the stationary wheels touch the runway at a high rate of speed.

Another object of this invention is to provide means for spraying liquid on the runway in advance of the landing wheels of an airplane as the airplane approaches a landing to thereby reduce the frictional drag and intense landing shock which occurs when the stationary wheels touch the ground at a high rate of speed.

Yet another object of this invention is to provide apparatus of the class described, which is simple in construction, easy to install in and upon conventional aircraft, which is easy and economical to operate, and which is sturdy and rugged in construction and durable over a long period of use.

With these and other objects in view, all of which more fully hereinafter appear, my invention comprises certain new and novel construction combinations and arrangements of elements, as hereinafter described, and as defined in the appended claims, and illustrated in preferred embodiment in the accompanying drawing which:

Figure 1 is a fragmentary section of the under portion of a conventional airplane fuselage illustrating the landing gear with the present invention installed in association therewith.

Figure 2 is an elevation of the landing gear and associated invention as illustrated at Fig. 1 viewed as indicated by the arrow 2 at Figure 1.

Figure 3 is a section of a control box element of the present invention as viewed substantially from the indicated line 3—3 at Fig. 2.

Fig. 4 is a fragmentary view of the landing gear, similar to Fig. 1 but illustrating the tire of the wheel contacting a runway and with the lubricating medium being applied to the tire and runway.

In the landing of large aircraft at high speeds with the landing wheels stationary at the instant of contact, there occurs a severe landing shock from the sudden contact of the tires of the non-rotating wheels with the runway. Actually, there is a terrific strain upon and a severe abrasion of, the tires until the wheels attain a speed of rotation sufficient to permit them to roll upon the runway. Various means and devices have been conceived to avoid these results, the most common being to cause the wheels to attain an initial rotation prior to landing and another being to provide a pool of water in that portion of the runway where the wheels make their initial contact. None of these expedients has proved satisfactory as evidenced by the fact that they have not been generally adopted by the industry, notwithstanding the long and universally-recognized need for lessening the friction of tires on runways. In this situation the present invention was conceived and developed and comprises in essence, a spraying apparatus adapted to wet the tires of the landing wheels, and narrow strips of the runway in the paths of the wheels as they are about to contact the runway.

The lubricating medium is preferably water, which acts as a good lubricant for rubber and soon evaporates to leave the runway in its normal condition. Other lubricating media may be used if desired though water is effective and cheap.

In the drawing a portion 10 of the fuselage of a conventionally indicated airplane is illustrated with a conventional landing gear, generally indicated at 11, depending therefrom, the landing gear comprising strut members 12, pivotally carried by journals 13 of the fuselage 10 and adapted to be retracted into a compartment 14 in the fuselage as by an actuator member indicated at 15, and a shaft 16 outstanding the strut members 12 and carrying a wheel 17 of conventional type having a pneumatic tire 18. Other conventional features of this landing gear include a brake drum 19 on the wheel 17 and a braking cylinder 20 carried upon the strut members 12.

In adapting the present invention to such a conventional arrangement a water reservoir tank 21 is carried in the fuselage 10, preferably in the compartment 14 and having a supply line 22, the tank 21 being preferably adjacent a journal 13, whereby to provide as short a supply line 22 as possible, it being desirable that the flow come through line 22 as quickly as possible as hereinafter explained. The tank 21 is conveniently held in place by removable clips 23, and a suitable filling plug 24 is provided in the tank 21. This tank is adapted to be pressurized by any conventional means, and in the illustrated construction, a compressed gas vial 25 is connected therewith to provide a self-contained unit, the compressed gas in the vial 25 providing a rapid flow of water from the tank 21 without substantial drop of pressure, and further being adapted to be operative instantly upon activation.

The supply line 22 may be conveniently directed along and downward of a frontal strut member 12 to an electro-responsive valve 26 carried by such strut member adjacent the top portion of the wheel 17. From this valve, a spray line 27 extends laterally from the strut member 12 along but forwardly spaced from the tread of the tire 18 and preferably extending to a point below the horizontal plane of the shaft 16, and is provided with a plurality of jet nozzles 28 facing the tire tread. At the lower terminus of the spray line 27 is an outwardly directed nozzle 29 which is adapted to spray the runway in front of the wheel as it is. It is to be noted that the spray line 27 may be supported by a suitable brace member 30, and it is to be understood that the member 30 is representative of any of several means to hold the spray line 27 depending upon the design of the landing apparatus in association with which this invention is installed. Line 27 terminates at a point which will avoid contact with runway as the tire is distorted by a landing as indicated at Fig. 4, and it is further contemplated that there will be sufficient flexibility in the spray line 27 to avoid permanent distortion due to shock such as, for example, that resulting from striking the runway.

The electro-responsive valve 26 is connected with a switch control box 31 through circuits 32, the circuits being connected to a power source 33 and a master control switch 34, illustrated diagrammatically at Fig. 3 only, such elements being found at various locations in different types of aircraft. The switch control box 31 carries therein a switch member comprising contacts 35 and 36, the contact 35 being carried upon a rocker arm 37 and the contact 36 being carried by the box 31. Closure of these contacts reacts to close the circuit 32 and open the valve 26. However, these contacts are normally held open by resilient means as spring 38 attached to the arm 37. Closure of the contacts is effected through a feeler arm 39 which is pivotally carried from the box 31 and normally depending below the lower edge of the wheel, as illustrated at Figs. 1 and 2, whereby it contacts the runway an instant prior to the tire contact, and such contact causes a backward rotation of the feeler arm 39. This movement or rotation of the feeler arm 39 reacts to likewise rotate and depress a resilient finger 40 connected thereto in contact with the rocker arm 37 whereby said rocker arm is likewise depressed to close the contacts 35 and 36 thus opening valve 26 and starting the spray against the tire tread and the runway.

Various means may be associated with the elements within the control box 31 to again open the switch contacts 35 and 36 and close valve 26 responsive to the rotation of the wheels whereby to stop the spray after the wheels are in rotation. In the present embodiment, an offset arm 41 extends from the box to carry an indicator wheel 42 contacting and rotatable with the rim of wheel 17. This indicator wheel is connected, as through shaft 41 and suitable gears 43, to a governor 44 which reacts against the arm 37 to raise it and open the contacts as the wheel 17 reaches the desired rotative speed. After a landing of the airplane, the operator generally comes to a stop and brakes his wheels, as by pressurizing the brake cylinder 20 in a conventional manner. A short fluid line 45 connects the braking cylinder 20 to a small cylinder 46 within the box 31, and the cylinder 46 carries therein a piston 47 which is adapted to bear against the arm 37 to open the switch contacts whenever the cylinder 20 becomes pressurized.

It is further contemplated that the flow of the water may be shut off whenever desired by manual operation of a switch such as master control switch 34.

While I have illustrated and described a preferred construction of my invention, it is apparent that various other arrangements are possible to effectuate a spray of the wheels and of the landing strip at the proper instants and that various alterations and modifications, all within the spirit and scope of my invention, will occur to those skilled in the art, and hence it is my desire that I be limited in my protection not by details of construction illustrated and described but only by the proper scope of the appended claims.

I claim:

1. In aircraft having landing gear inclusive of wheels and tires, the improvement for reducing the friction and shock of initial contact between the runway and the aircraft tires during landing which comprises a reservoir for carrying a supply of lubricant in the aircraft, a conduit positioned adjacent the wearing surface of said tires when the landing gear is in extended position, said conduit having discharge openings therein directed toward the wearing surface of said tires, conduit means interconnecting said reservoir and discharge conduit, a valve member intermediate said reservoir and discharge conduit for controlling the application of lubricant to said tires, and electrical switch means for actuating said valve member.

2. In aircraft having landing gear inclusive of wheels and tires, the improvement for reducing the friction and shock of initial contact between the runway and the aircraft tires during landing which comprises a reservoir for carrying a supply of lubricant in the aircraft, a conduit positioned adjacent the wearing surface of said tires when the landing gear is in extended position, said conduit having discharge openings therein directed toward the wearing surface of said tires, conduit means interconnecting said reservoir and discharge conduit, a valve member intermediate said reservoir and discharge conduit for controlling the application of lubricant to said tires, and means projecting past the tires during landing for initial contact with the runway for actuating said valve member to lubricate the wearing surface of the tires prior to shock contact with the runway.

3. In aircraft having landing gear inclusive of wheels and tires, the improvement for reducing the friction and shock of initial contact between the runway and the aircraft tires during landing which comprises a reservoir for carrying a supply of lubricant in the aircraft, a conduit positioned adjacent the wearing surface of said tires when the landing gear is in extended position, said conduit having discharge openings therein directed toward the wearing surface of said tires, conduit means interconnecting said reservoir and discharge conduit, a valve member intermediate said reservoir and discharge conduit for controlling the application of lubricant to said tires, and means responsive to rotation of the landing wheel gear for closing said valve member to cut off the supply of lubricant when said wheel has reached a predetermined rotational speed.

4. In aircraft having landing gear inclusive of wheels, tires and a braking system, the improvement for reducing the friction and shock of initial contact between the runway and the aircraft tires during landing which comprises a reservoir for carrying a supply of lubricant in the aircraft, a conduit positioned adjacent the wearing surface of said tires when the landing gear is in extended position, said conduit having discharge openings therein directed toward the wearing surface of said tires, conduit means interconnecting said reservoir and discharge conduit, a valve member intermediate said reservoir and discharge conduit for controlling the application of lubricant to said tires, and means interconnected with the braking system of said aircraft for closing said valve member to stop the flow of lubricant when the braking system is actuated for slowing down said aircraft.

5. In aircraft having landing gear inclusive of wheels and tires, the improvement for reducing the friction and shock of initial contact between the runway and the aircraft tires during landing which comprises a reservoir for carrying a supply of lubricant in the aircraft, a conduit positioned adjacent the wearing surface of said tires when the landing gear is in extended position, said conduit having discharge openings therein directed toward the wearing surface of said tires and downwardly toward the runway, conduit means interconnecting said reservoir and discharge conduit, a valve member intermediate said reservoir and discharge conduit for controlling the application of lubricant to said tires, and means for subjecting said reservoir and the lubricant therein to pressure influences greater than atmospheric to assure immediate distribution of said lubricant against the wearing surface of said tires and runway when said valve member is opened.

6. In aircraft having retractable landing gear inclusive of wheels, tires and a braking system, the improvement for reducing the friction and shock of initial contact between the runway and the aircraft tires during landing which comprises a reservoir for carrying a supply of lubricant in the aircraft, an arcuate discharge conduit positioned adjacent the wearing surface of said tires when the landing gear is in extended position, nozzles carried by said conduit and directed toward the forwardly disposed wearing surface of said tires and toward the runway, conduit means interconnecting said reservoir and discharge conduit, an electrically controlled valve member intermediate said discharge conduit and reservoir for controlling the application of lubricant to said tires, electrical switch means for actuating said valve member, means projecting past the tires during landing for initial contact with the runway for actuating said electrical switch and said valve member to release lubricant for projection against the wearing surface of the tires prior to shock contact with said runway, and means interconnected with the braking system of said aircraft for actuating said electrical switch means and valve member to stop the flow of lubricant when the aircraft braking system is actuated to slow said aircraft.

References Cited in the file of this patent

UNITED STATES PATENTS

| Number | Name | Date |
|---|---|---|
| 742,786 | Green | Oct. 27, 1903 |
| 1,928,471 | Wigley | Sept. 26, 1933 |
| 2,386,301 | Duke | Oct. 9, 1945 |
| 2,466,150 | Burt | Apr. 5, 1949 |

FOREIGN PATENTS

| Number | Country | Date |
|---|---|---|
| 18,301 | Great Britain | of 1906 |
| 379,153 | France | Sept. 2, 1907 |
| 522,018 | France | Mar. 18, 1921 |